(12) United States Patent
Nomura

(10) Patent No.: US 9,968,985 B2
(45) Date of Patent: May 15, 2018

(54) BEAD RING WINDING DEVICE

(75) Inventor: Shigeaki Nomura, Hashima (JP)

(73) Assignees: Fuji Seiko Co., Ltd (JP); Fuji Shoji Co., Ltd (JP)

( * ) Notice: Subject to any disclaimer, the term of this patent is extended or adjusted under 35 U.S.C. 154(b) by 43 days.

(21) Appl. No.: 14/395,435

(22) PCT Filed: Apr. 26, 2012

(86) PCT No.: PCT/JP2012/061207
§ 371 (c)(1),
(2), (4) Date: Oct. 17, 2014

(87) PCT Pub. No.: WO2013/161031
PCT Pub. Date: Oct. 31, 2013

(65) Prior Publication Data
US 2015/0059916 A1    Mar. 5, 2015

(51) Int. Cl.
*B21F 37/00* (2006.01)
*B29D 30/48* (2006.01)

(52) U.S. Cl.
CPC .............. *B21F 37/00* (2013.01); *B29D 30/48* (2013.01); *B29D 2030/487* (2013.01)

(58) Field of Classification Search
CPC .......... B21F 37/00; B21F 37/02; B21F 37/04; B21F 31/00; B21F 3/00; B21F 3/02; H02K 15/045; H02K 15/457; B20D 30/48; B20D 2030/487
USPC ............................................... 140/92.2, 71 C
See application file for complete search history.

(56) References Cited

U.S. PATENT DOCUMENTS

| 4,724,873 A | 2/1988 | Abe | |
| 5,579,810 A * | 12/1996 | Ramsey | B21F 27/16 140/3 CA |
| 8,772,160 B2 | 7/2014 | Yamazaki et al. | |
| 9,174,258 B2 * | 11/2015 | Freitag | B21D 5/083 |

(Continued)

FOREIGN PATENT DOCUMENTS

| CN | 2558630 U | 7/2003 |
| CN | 201998441 U | 10/2011 |

(Continued)

OTHER PUBLICATIONS

Translation of the International Preliminary Report on Patentability for PCT/JP2012/061207, dated Jul. 31, 2012, pp. 1-5.

(Continued)

*Primary Examiner* — R. K. Arundale
*Assistant Examiner* — Pradeep C Battula
(74) *Attorney, Agent, or Firm* — Tarolli, Sundheim, Covell & Tummino LLP

(57) ABSTRACT

A bead ring winding device forms a bead ring by winding a wire fed to the circumference of a former, which is coupled to, in a removable manner, and supported by a rotation shaft. The bead ring winding device includes a guide and a driving member. The guide guides a bearing so that the bearing can be lifted and lowered. The bearing supports the rotation shaft. The driving member lifts and lowers the bearing along the guide. When the former is replaced with another former of a different diameter, the bearing is lifted or lowered with the driving member so that the upper end of the former is arranged at a fixed position.

4 Claims, 4 Drawing Sheets

(56) References Cited

U.S. PATENT DOCUMENTS 9,177,719 B2 * 11/2015 Yamaguchi ......... H01F 41/0612
2009/0266474 A1    10/2009 Matsuyama et al.

FOREIGN PATENT DOCUMENTS

| | | |
|---|---|---|
| CN | 202174748 U | 3/2012 |
| JP | 58023524 A * | 2/1983 |
| JP | S5823524 A | 2/1983 |
| JP | S62101423 A | 5/1987 |
| JP | H 06286022 A | 10/1994 |
| JP | 09-267410 | 10/1997 |
| JP | 11-076918 | 3/1999 |
| JP | 2010120284 A | 6/2010 |
| JP | 2011-037059 | 2/2011 |
| JP | 2011199271 A | 10/2011 |
| WO | WO 2008/010293 A1 | 1/2008 |

OTHER PUBLICATIONS

Office Action for corresponding CN patent application 201280072575.3 dated Jul. 30, 2015.
Office Action for Application No. 2014-512232 dated Mar. 8, 2016.

* cited by examiner

BEAD RING WINDING DEVICE

RELATED APPLICATIONS

The present invention is a U.S. National Stage under 35 USC 371 patent application, claiming priority to Serial No. PCT/JP2012/061207, filed on 26 Apr. 2012; the entirety of which is incorporated herein by reference.

TECHNICAL FIELD

The present invention relates to a bead ring winding device that winds a wire around the circumference of a former to form a bead ring.

BACKGROUND ART

A typical bead ring winding device includes a wire feeding unit located at a height corresponding to the upper end of a former, which is supported by a rotation shaft. Wire is fed from the feeding unit to the circumference of the former as the former rotates to wind the wire and form a bead ring. Conventionally, in a bead ring winding device of such a structure, when changing the winding diameter of the bead ring that is to be formed, the former is removed from the rotation shaft and replaced with another former having a diameter conforming to that bead ring winding diameter.

SUMMARY OF THE INVENTION

Problems that are to be Solved by the Invention

In the bead ring winding device of the conventional structure, after replacing the former, the location of the wire feeding unit no longer corresponds to the upper end of the replacement former. This hinders stable feeding of the wire to the circumference of the replacement former.

To cope with such a problem, the device supporting the former and the rotation shaft may be formed to be entirely movable in the vertical direction in order to move the upper end of the replacement former to a position corresponding to the wire feeding unit. However, the overall device including the former is very heavy. Thus, it would be burdensome and difficult to accurately move the former to the predetermined position.

Accordingly, it is an object of the present invention to provide a bead ring winding device that allows for, when replacing a former on a rotation shaft with another former of a different diameter, easy and accurate movement of the replacement former to arrange the upper end of the replacement former at a predetermined position.

Means for Solving the Problem

To achieve the above object, the present invention provides a bead ring winding device that forms a bead ring by winding a wire fed to the circumference of a former, which is coupled to, in a removable manner, and supported by a rotation shaft. The bead ring winding device includes a guide and a driving member. The guide guides a bearing so that the bearing can be lifted and lowered. The bearing supports the rotation shaft. The driving member lifts and lowers the bearing along the guide.

Accordingly, in the bead ring winding device of the present invention, when replacing the former on the rotation shaft with another former of a different diameter to change the winding diameter of the bead ring, the bearing is lifted or lowered along the guide with the driving member to change the position of the replacement former. Thus, the replacement former is easily and accurately moved to arrange the upper end of the replacement former at the predetermined height.

The bead ring winding device may include a wire feeding unit that feeds the wire to the former. The wire feeding unit is located at a height corresponding to an upper limit of a range in which the former is lifted and lowered.

The driving member may include a servomotor. Further, the bead ring winding device may include a memory, which stores data related to an amount of rotation produced by the servomotor in correspondence with the diameter of the former, and a control unit, which controls rotation produced by the servomotor to move the upper end of the former to a fixed position based on the data stored in the memory.

The bead ring winding device may include a detector that detects whether the upper end of the former is located at a fixed position.

The bead ring winding device may include a biasing device that applies a winding bias to the wire fed to the former. The biasing device is located at a height corresponding to the upper end of the former.

Effect of the Invention

As described above, when replacing a former on a rotation shaft with another former of a different diameter, the present invention allows for easy and accurate movement of the replacement former to arrange the upper end of the replacement former at a predetermined position.

EMBODIMENTS OF THE INVENTION

A bead ring winding device according to one embodiment of the present invention will now be described with reference to the drawings.

Figure 1:
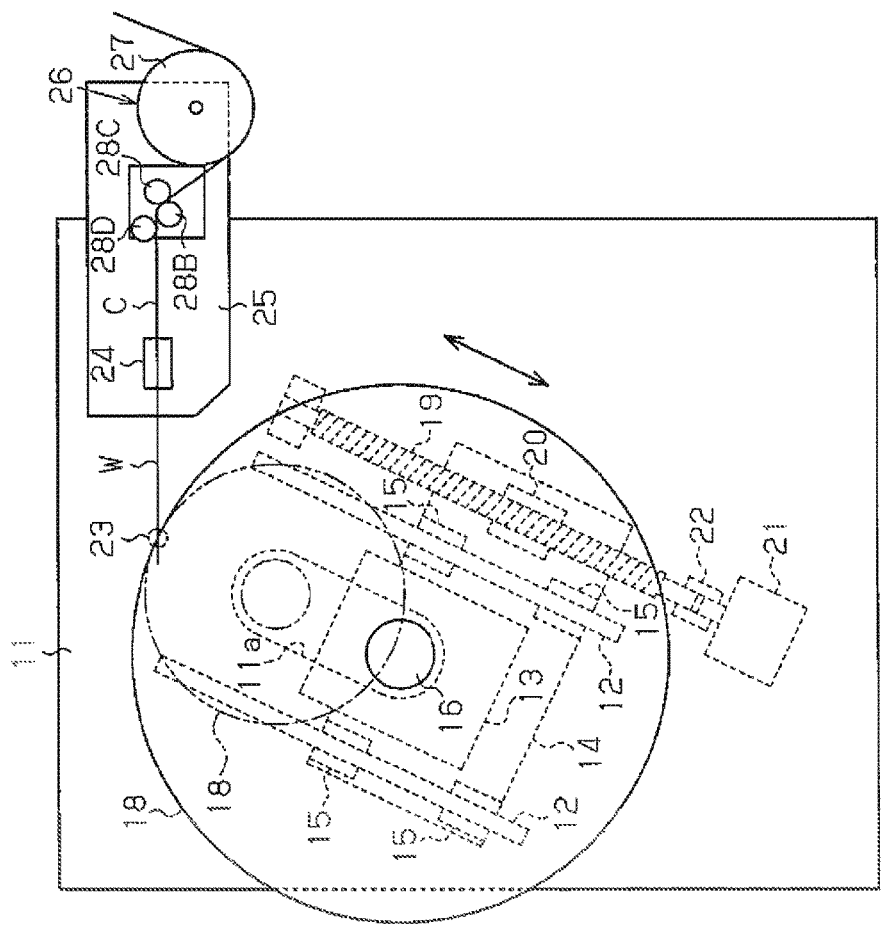
FIG. 1 is a front view of a bead ring winding device according to one embodiment of the present invention.
Figure 2:
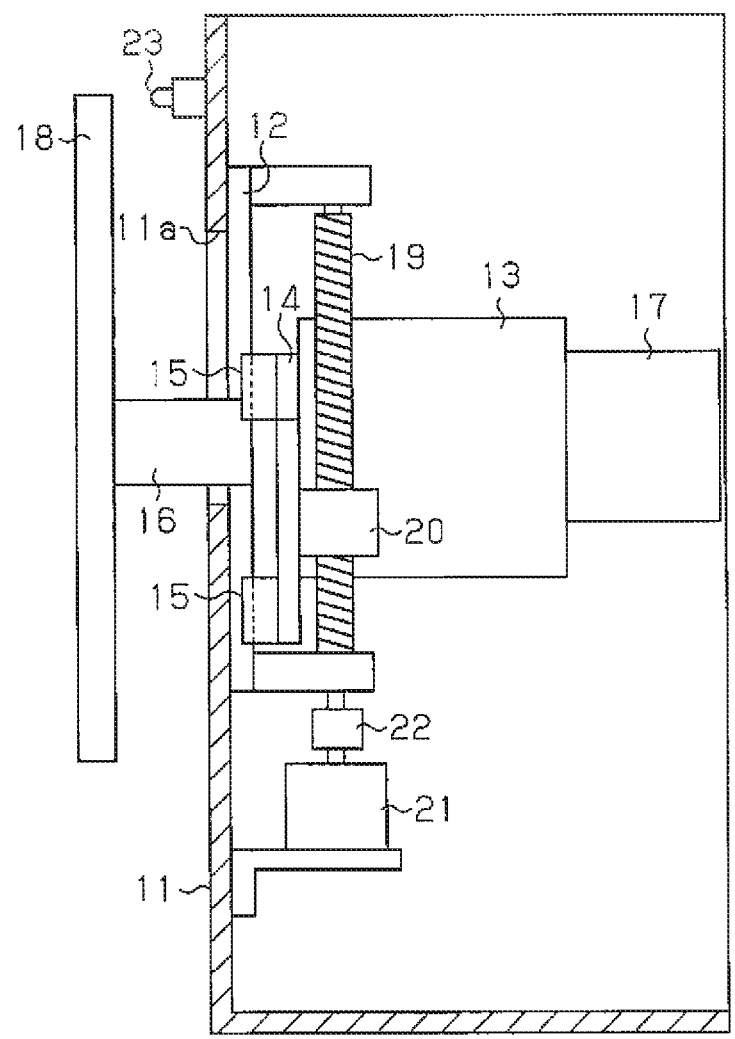
FIG. 2 is a vertical cross-sectional view of the bead ring winding device shown in FIG. 1.

Referring to FIGS. 1 and 2, a device frame 11 includes a front wall having a rear surface on which two parallel guides 12 are arranged to extend diagonally upward to the right as viewed in FIG. 1. A bearing 13 is supported on the guides 12 by a support plate 14 and guided portions 15 so that the bearing 13 can be lifted and lowered in the extending direction of the guides 12. A rotation shaft 16, which has a horizontal axis, is rotatably supported by the bearing 13. The rotation shaft 16 projects toward the front through an elongated hole 11a formed in the front wall of the device frame 11. A rear portion of the bearing 13 supports a rotation servomotor 17, which is used to rotate the rotation shaft 16. A round former 18 is coupled to, in a removable manner, and supported by the front end of the rotation shaft 16 outside the device frame 11. Wire W is wound around the circumference of the former 18 as the former 18 rotates to form a bead ring.

As shown in FIGS. 1 and 2, a ball screw 19, which forms a part of a driving member, is supported to be rotatable about an axis extending parallel to the guides 12 on the rear surface of the front wall of the device frame 11. A female threaded body 20, which forms a part of the driving member and is joined with the ball screw 19, is arranged on the support plate 14. A lifting-lowering servomotor 21, which forms a part of the driving member, is arranged on the rear surface of the front wall of the device frame 11. The servomotor 21 includes a motor shaft that is connected to the ball screw 19 by a coupling 22. When the lifting-lowering servomotor 21 rotates the ball screw 19, the female threaded body 20 lifts and lowers the support plate 14 and the bearing 13 along the guides 12. Thus, even when the former 18 is replaced with another former 18 of a different diameter, the upper end of the replacement former 18 can always be moved to a predetermined height.

As shown in FIGS. 1 and 2, a detector 23, which is formed by a photosensor or the like, is arranged on the front surface of the device frame 11 and located at a position corresponding to a fixed position where the upper end of the former 18 is to be located. When the rotation of the lifting-lowering servomotor 21 lifts and lowers the bearing 13 and the position of the former 18 changes, the detection of the detector 23 is used to check whether the upper end of the former 18 is located at the fixed position.

As shown in FIG. 1, a wire feeding unit 24, which feeds the wire W to the circumference of the former 18 by guiding the wire W toward the upper end of the former 18, is held by a bracket 25 on the front surface of the device frame 11 and located at substantially the same height as the upper limit of the lifting and lowering range of the former 18. A biasing device 26 that applies a winding bias to the wire W is arranged on the bracket 25 at the upstream side of the wire feeding unit 24 in the feeding line of the wire W extending to the former 18. The biasing device 26 is located at substantially the same height as the upper end of the former 18.

Figure 3:
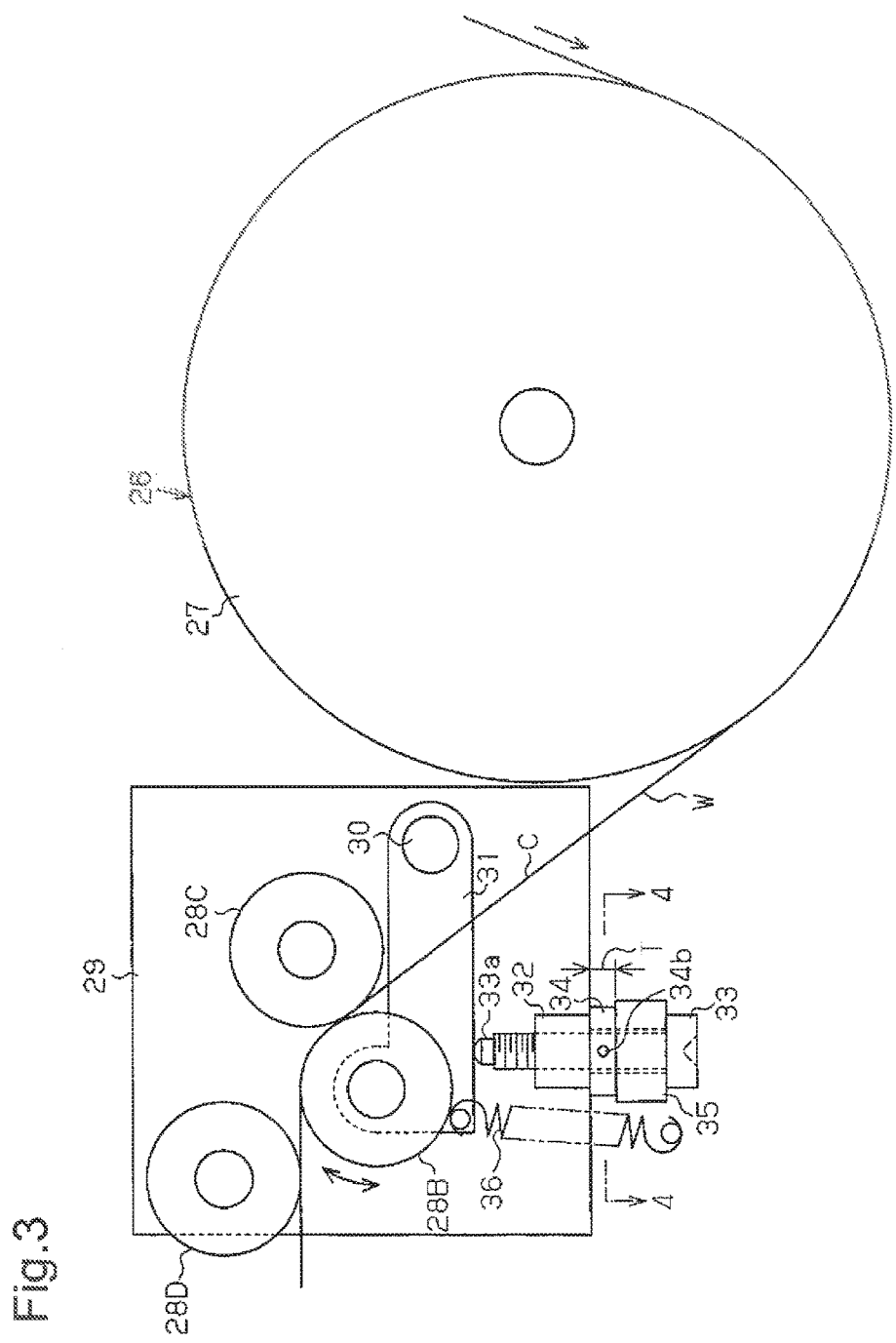
FIG. 3 is an enlarged front view of a biasing device arranged in a wire feeding line extending to the bead ring winding device.

As shown in FIGS. 1 and 3, the biasing device 26 includes a single large-diameter roller 27, which is located at the upstream side in the feeding line of the wire W, and a plurality of small-diameter rollers 28B, 28C, and 28D, which are located at the downstream side of the large-diameter roller 27. Among the small-diameter rollers 28B to 28D, the two small-diameter rollers 28C and 28D are supported to be rotatable at fixed positions by a support plate 29, which is coupled to the bracket 25. The remaining small-diameter roller 28B is supported to be rotatable by a distal end of a pivot lever 31, which is pivotally coupled to a support shaft 30 on the support plate 29. The pivoting of the pivot lever 31 changes the position of the small-diameter roller 28B and varies the biasing degree of the wire W.

More specifically, the large-diameter roller 27 mainly functions to apply tension to the wire W, and the small-diameter rollers 28B to 28D mainly function as biasing rollers. Further, the small-diameter roller 28D functions to restrict upward displacement of the wire W after passing over the small-diameter roller 28B.

As shown in FIG. 3, a nut 32 is fixed to the support plate 29 below the pivot lever 31. An adjustment screw 33 is joined in a rotatable manner with the nut 32. The distal end of the adjustment screw 33 defines an engagement portion 33a, which can be engaged with a distal side edge of the pivot lever 31. An adjustment collar 34 is coupled in a removable manner to the threaded portion of the adjustment screw 33 between the head of the adjustment screw 33 and the nut 32 with a seat 35 held on the head. A spring 36 is hooked to the distal end of the pivot lever 31 to pivotally urge the pivot lever 31 in the counterclockwise direction as viewed in FIG. 3. The urging caused by the spring 36 pivots the pivot lever 31 to a position where the pivot lever 31 is engaged with the engagement portion 33a of the adjustment screw 33.

Figure 4:
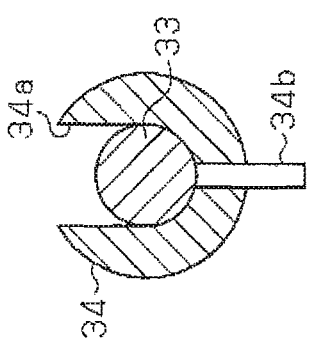
FIG. 4 is an enlarged cross-sectional view taken along line 4-4 in FIG. 3.

As shown in FIGS. 3 and 4, one side of the adjustment collar 34 includes an opening 34a to allow for sideward coupling and removal of the adjustment collar 34 to and from the threaded portion of the adjustment screw 33. A holding pin 34b, which is used when coupling and removing the adjustment collar 34, projects from the adjustment collar 34 at the opposite side of the opening 34a. In this embodiment, another adjustment collar 34 having a different thickness T is also prepared. When coupling the other adjustment collar 34 having a different thickness T, the pivot lever 31 is pivoted and moved. As a result, the position of the small-diameter roller 28B is changed. This changes the biasing degree of the wire W.

The electric circuit configuration of the bead ring winding device will now be described.

Figure 5:
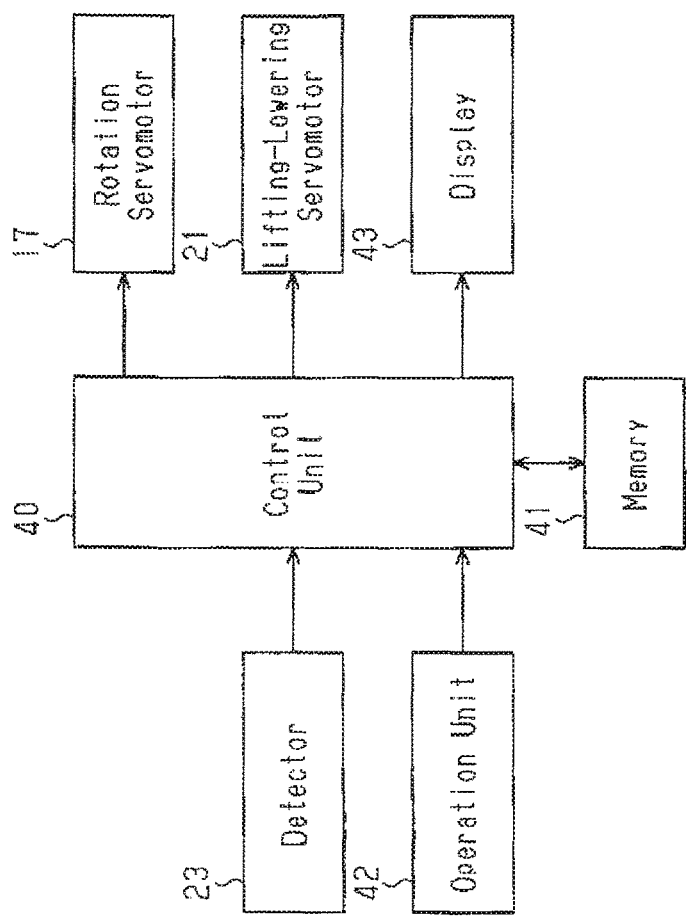
FIG. 5 is a block diagram of the circuit configuration of the bead ring winding device shown in FIG. 1.

As shown in FIG. 5, a control unit 40, which controls the operation of the entire device, is connected to a memory 41. The memory 41 stores data related to the amount of rotation produced by the lifting-lowering servomotor 21 in correspondence with the diameters of various formers 18 and data related to the amount of rotation produced by the rotation servomotor 17 in correspondence with various wire winding numbers. The control unit 40 receives detection data from the detector 23 and input data from an operation unit 42. The control unit 40 sends drive signals to the rotation servomotor 17 and the lifting-lowering servomotor 21, and display data to a display 43.

When replacing the former 18 on the rotation shaft 16, the control unit 40 receives data related to the diameter of the replacement former 18 from the operation unit 42. Then, based on the corresponding one of the data related to the rotation amount of the lifting-lowering servomotor 21 stored in the memory 41, the control unit 40 controls the rotation produced by the lifting-lowering servomotor 21 so that the upper end of the former 18 is arranged at the fixed position. Further, when winding the wire W around the circumference of the former 18 to form a bead ring, the control unit 40 controls the rotation produced by the rotation servomotor 17 so that a predetermined number of windings of the wire W is obtained based on the corresponding one of the data related to the rotation amount of the rotation servomotor 17.

The operation of the bead ring winding device will now be described.

In the bead ring winding device, when replacing the former 18 on the rotation shaft 16 with another former 18 of a different diameter to change the winding diameter of the bead ring, for example, when replacing a large-diameter former 18, which is shown by the solid line in FIG. 1, with a small-diameter former 18, which is shown by the broken-line in the same drawing, an operator inputs data related to the diameter of the replacement former 18 with the operation unit 42. As a result, under the control of the control unit 40, the corresponding one of the data related to the rotation amount of the lifting-lowering servomotor 21 stored in the memory 41 is read, and the lifting-lowering servomotor 21 produces rotation based on the rotation amount data. After replacing the former 18, the rotation shaft 16 of the former 18 is first moved to a home position at the lowermost end. Then, the lifting-lowering servomotor 21 produces a certain amount of rotation in accordance with the data of the memory 41 to lift the former 18 from the home position.

More specifically, the rotation produced by the lifting-lowering servomotor 21 lifts and lowers the bearing 13 with the ball screw 19 and the female threaded body 20 along the guides 12. Thus, even when the large-diameter former 18 is replaced by the small-diameter former 18, the upper end of the small-diameter former 18 subsequent to the replacement can be arranged at the fixed position located at the same height as the wire feeding unit 24 like the large-diameter former 18 prior to the replacement.

When the upper end of the replacement former 18 is arranged at the fixed position, the detector 23 detects such a situation and sends a corresponding detection signal to the control unit 40. Thus, even when an error occurs in the rotation control of the lifting-lowering servomotor 21 executed by the control unit 40, the control unit 40 stops the rotation of the lifting-lowering servomotor 21 based on the detection signal of the detector 23 so that the upper end of the former 18 is accurately arranged at the fixed position. That is, even when the rotation of the lifting-lowering servomotor 21 stops in accordance with the data of the memory 41, as long as the upper end of the former 18 has not reached the height of the detector 23, the lifting-lowering servomotor 21 continues to produce rotation. On the other hand, when the upper end of the former 18 reaches the height of the detector 23 before the rotation of the lifting-lowering servomotor 21 stops in accordance with the data of the memory 41, the rotation of the lifting-lowering servomotor 21 is stopped at that time.

Accordingly, when winding and forming a bead ring after replacing the former 18, the wire W is stably fed from the wire feeding unit 24 to the circumference of the replacement former 18.

Further, if there is a need to change the biasing degree of the wire W with the biasing device 26 such as when replacing the former 18, the adjustment screw 33 shown in FIG. 3 is loosened. This releases the adjustment collar 34 held between the head of the adjustment screw 33 and the nut 32. Under this condition, the adjustment collar 34 is removed sideward from the threaded portion of the adjustment screw 33 and the other adjustment collar 34 having a different thickness T is attached to the threaded portion of the adjustment screw 33.

Then, the adjustment screw 33 is tightened to hold the replacement adjustment collar 34 between the head of the adjustment screw 33 and the nut 32, and the position of the adjustment screw 33 is changed in accordance with the thickness T of the adjustment collar 34. The pivot lever 31 is pivoted in accordance with the change in the position of the adjustment screw 33. This changes the position of the small-diameter roller 28B. By changing the position of the small-diameter roller 28B in this manner, the biasing degree of the wire W is varied. Thus, the simple operation of replacing the adjustment collar 34 allows for easy adjustment of the biasing degree of the wire W.

Accordingly, the present embodiment has the advantages described below.

(1) In the bead ring winding device, when replacing the former 18 on the rotation shaft 16 with another former 18 of a different diameter to change the winding diameter of the bead ring, the bearing 13, which supports the rotation shaft 16, is lifted or lowered along the guides 12 with the driving member 19 to 21 to change the position of the replacement former 18. Thus, the replacement former 18 is easily and accurately moved to arrange the upper end of the replacement former 18 at the predetermined height.

(2) In the bead ring winding device, the wire feeding unit 24, which feeds the wire W to the former 18, is arranged at the same height as the upper limit of the lifting and lowering range of the former 18. Thus, when replacing the former 18, the upper end of the replacement former 18 is arranged at the fixed position located at substantially the same height as the wire feeding unit 24, and the wire W is stably fed to the circumference of the replacement former 18.

(3) In the bead ring winding device, the driving member 19 to 21 include the lifting-lowering servomotor 21. The memory 41 stores data related to the rotation amount of the lifting-lowering servomotor 21 in correspondence with the diameter of the former 18. The control unit 40 controls the rotation of the lifting-lowering servomotor 21 so that the upper end of the former 18 is arranged at the fixed position based on the data stored in the memory 41. When replacing the former 18, the lifting-lowering servomotor 21 produces rotation under the control of the control unit 40 based on the data stored in the memory 41 to lift and lower the bearing 13 so that the upper end of the replacement former 18 is arranged at the fixed position. Thus, the movement and adjustment of the former 18 is easily and accurately performed in accordance with the diameter of the former 18.

(4) In the bead ring winding device, the detector 23 detects whether the upper end of the former 18 is located at the fixed position. Thus, the former 18 is accurately positioned based on the detection of the detector 23.

(5) In the bead ring winding device, the biasing device 26, which applies a winding bias to the wire W fed to the former 18, is located at substantially the same height as the fixed position where the upper end of the former 18 is to be arranged. Thus, when replacing the former 18, the upper end of the replacement former 18 is arranged at the same height as the biasing device 26.

(6) In the bead ring winding device, the adjustment collar 34 is used to adjust the position of the biasing roller 28B in the biasing device 26. Thus, the biasing degree is easily varied just by changing the adjustment collar 34 and tightening the adjustment screw 33. Further, by tightening the adjustment collar 34 with the adjustment screw 33, the adjustment collar 34 functions as a washer to limit loosening of the adjustment screw 33.

Modified Examples

The present embodiment may be modified as described below.

In the above embodiment, the position of the upper end of the former 18 may be set based on only the detection of the detector 23.

The biasing device 26 may be omitted from the above embodiment.

DESCRIPTION OF REFERENCE CHARACTERS

11: device frame, 12: guides, 13: bearing, 16: rotation shaft, 17: rotation servomotor, 18: former, 19: ball screw forming a part of driving member, 20: female threaded body forming a part of driving member, 21: lifting-lowering servomotor forming a part of driving member, 23: detector, 24: wire feeding unit, 26: biasing device 26, 40: control unit, 41: memory, W: wire.

The invention claimed is:

1. A bead ring winding device comprising:
a wire feeding unit;
a former receiving wire from the wire feeding unit around a circumference of the former to form a bead ring;
a rotation shaft extending in a plane, the former being removably coupled to the rotation shaft;

a bearing rotatably supporting the rotation shaft;

a guide arranged to move the bearing relative to the wire feeding unit along a first axis extending perpendicular to the plane and simultaneously along a second axis that extends perpendicular to the first axis, the guide extending along a third axis that is diagonal relative to both the first axis and the second axis; and a driving member that moves the bearing along the guide.

2. The bead ring winding device according to claim 1, wherein the driving member includes a servomotor, the bead ring winding device further comprising:

a memory that stores data related to an amount of rotation produced by the servomotor in correspondence with the diameter of the former; and a control unit that controls rotation produced by the servomotor to move an upper end of the former to a fixed position based on the data stored in the memory.

3. The bead ring winding device according to claim 1, further comprising a detector that detects whether an upper end of the former is located at a fixed position.

4. The bead ring winding device according to claim 1, further comprising a biasing device that applies a winding bias to the wire fed to the former, wherein the biasing device is located at a height corresponding to an upper end of the former.

* * * * *